United States Patent [19]
Nagai

[11] Patent Number: 5,642,239
[45] Date of Patent: Jun. 24, 1997

[54] METHODS AND APPARATUS FOR CHANGING THE REPETITION RATE OF IMAGE DATA, AND FOR DETECTING STILL IMAGES AND SCENE CHANGES IN IMAGE DATA

[75] Inventor: Ryuzo Nagai, Kanagawa, Japan

[73] Assignee: Sony Corporation, Tokyo, Japan

[21] Appl. No.: 365,732

[22] Filed: Dec. 29, 1994

[30] Foreign Application Priority Data

Dec. 29, 1993 [JP] Japan .................................. 5-350624

[51] Int. Cl.$^6$ .................................................. G11B 5/00
[52] U.S. Cl. ............................ 360/8; 360/13; 386/52; 348/700
[58] Field of Search .............................. 360/8, 11.1, 13, 360/14.1, 26, 36.1, 53; 358/335; 348/390, 558, 700; 386/52, 53

[56] References Cited

U.S. PATENT DOCUMENTS

5,479,264  12/1995  Ueda et al. ............................ 358/335

*Primary Examiner*—Andrew L. Sniezek
*Attorney, Agent, or Firm*—William S. Frommer; Alvin Sinderbrand

[57] ABSTRACT

Methods and apparatus are provided for changing the repetition rate of image data. A correlation value representing similarity between fields or frames of the image data is produced and one or more fields or frames are added to or subtracted from the image data selectively based on the first correlation value to produce output image data having a repetition rate different from an initial repetition rate of the image data. In other aspects, methods and apparatus for detecting that a sequence of field or frame image data intervals represent a still image are provided which compare direct current components of corresponding discrete cosine transformed data blocks of sequential image data intervals to determine a number thereof which are equivalent, and determine that the image data intervals represent a still image when the sum number exceeds a predetermined threshold. In still other aspects, methods and apparatus for detecting a scene change within image data compare direct current components of discrete cosine transformed data blocks of sequential image data intervals to determine the number of such blocks which are equivalent, which is accumulated as a sum. The accumulated sums for sequential pairs of image data intervals are compared so that when their difference exceeds a predetermined value, it is determined that a scene change has occurred.

26 Claims, 10 Drawing Sheets

METHODS AND APPARATUS FOR CHANGING THE REPETITION RATE OF IMAGE DATA, AND FOR DETECTING STILL IMAGES AND SCENE CHANGES IN IMAGE DATA

BACKGROUND OF THE INVENTION

The present invention relates to methods and apparatus for changing the repetition rate of image data, as well as to methods and apparatus for detecting still images and scene changes in image data.

A known image data reproduction device reproduces image data at a variable speed as a sequence of fields whose repetition rate varies with respect to the repetition rate of the fields as output by the device for display. The reproduction device serves to absorb the differences in the repetition rates between the reproduced image data and the output image data by omitting or adding fields by means of a frame synchronizer, such as that which is disclosed in Japanese Laid Open Patent No. 136384/1986.

Figure 1A:
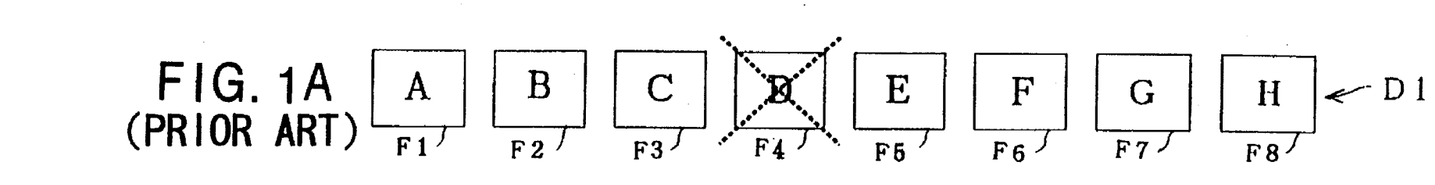
FIG. 1 is a schematic diagram for use in illustrating the shortcomings and disadvantages of a known technique for changing the repetition rate of image data.
Figure 1B:
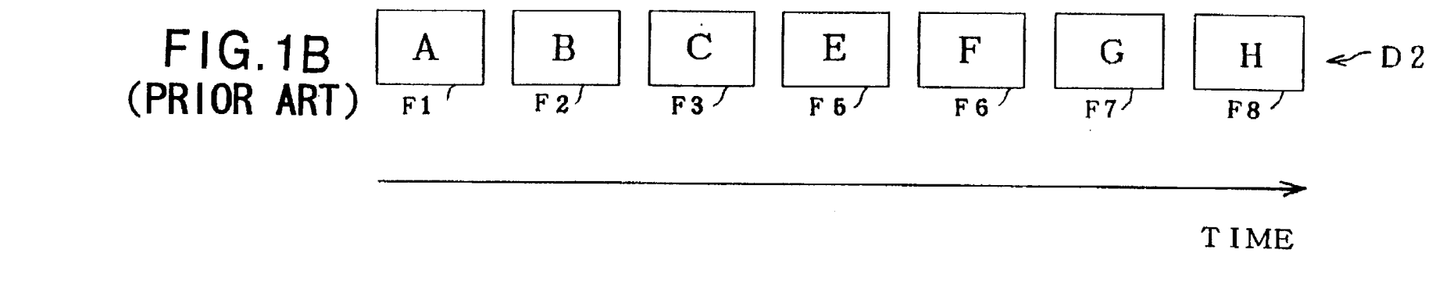

However, in this device the omission or addition of the fields occurs randomly, so that image discontinuity can become apparent to the viewer. This effect is illustrated with reference to FIG. 1. In FIG. 1, the fields of the image data as reproduced are represented schematically by the sequence (A) as a succession of fields F1 through F8 having the respective image data content "A" through "H". If it is assumed that one of these fields (in this example, field F4 having the image data content D) is omitted in order to reduce the field repetition rate, as illustrated by the sequence (B) in FIG. 1, it will be seen that a discontinuity is produced between the fields F3 and F5 in sequence (B). Where the fields depict rapid image movement, the discontinuity caused by omitting the field F4 becomes apparent, so that a sense of awkwardness in the image produced by the sequence (B) is unavoidably produced.

OBJECTS AND SUMMARY OF THE INVENTION

It is an object of the present invention to provide methods and apparatus for changing the repetition rate of image data which overcome the problems inherent in the known apparatus.

It is another object of the present invention to provide methods and apparatus for detecting that a sequence of image data intervals represents a still image, which may be implemented with the use of relatively simple and inexpensive means.

It is a further object of the present invention to provide methods and apparatus for detecting a scene change within image data which may be implemented by relatively simple and inexpensive means.

In accordance with the first aspect of the present invention, an apparatus and a method for changing the repetition rate of image data including a first sequence of field or frame image data intervals having a first repetition rate, comprise the means for and the steps of, respectively: producing a first correlation value representing similarity between first and second image data intervals of the image data based on a predetermined criterion; and selectively adding or subtracting the image data of at least one image data interval to or from the first sequence of image data intervals based on the first correlation value to produce output image data having a second repetition rate different from the first repetition rate.

In accordance with another aspect of the present invention, an apparatus and a method of detecting that a sequence of field or frame image data intervals represents a still image are provided, the image data intervals each being provided in the form of a plurality of blocks which have been transformed by discrete cosine transformation. The method and apparatus comprise the means for and the steps of, respectively: obtaining a direct current component of each of a plurality of blocks of a first image data interval; obtaining a direct current component of each of a plurality of blocks of a second image data interval next following the first image data interval in the sequence; comparing the direct current components of corresponding blocks of the first and second image data intervals to determine an equivalence of such corresponding blocks; producing sum data representing a number of the corresponding blocks of the first and second image data intervals that are equivalent; and producing a still picture detection signal when the sum data exceeds a predetermined threshold value.

In accordance with a further aspect of the present invention, an apparatus and a method of detecting a scene change within image data including a sequence of field or frame image data intervals are provided, each of the image data intervals being in the form of a plurality of blocks which have been transformed by discrete cosine transformation. The apparatus and the method comprise the means for and the steps of, respectively: obtaining a direct current component of each of a plurality of blocks of a first image data interval; obtaining a direct current component of each of a plurality of blocks of a second image data interval next following the first image data interval in the sequence; comparing the direct current components of corresponding blocks of the first and second image data intervals to determine an equivalence of such corresponding blocks; producing first sum data representing a number of the corresponding blocks of the first and second image data intervals that are equivalent; obtaining a direct current component of each of a plurality of blocks of a third image data interval next following the second image data interval in the sequence; comparing the direct current components of corresponding blocks of the second and third image data intervals to determine an equivalence of such corresponding blocks; producing second sum data representing a number of the corresponding blocks of the second and third image data intervals that are equivalent; determining a difference between the first and second sum data; and producing a scene change detection signal when the difference between the first and second sum data exceeds a predetermined threshold value.

The above, and other objects, features and advantages of the invention, will be apparent in the following detailed description of certain illustrative embodiments thereof which is to be read in connection with the accompanying drawings forming a part hereof, and wherein corresponding parts and components are identified by the same reference numerals in the several views of the drawings.

DETAILED DESCRIPTION OF CERTAIN ADVANTAGEOUS EMBODIMENTS

Figure 2:
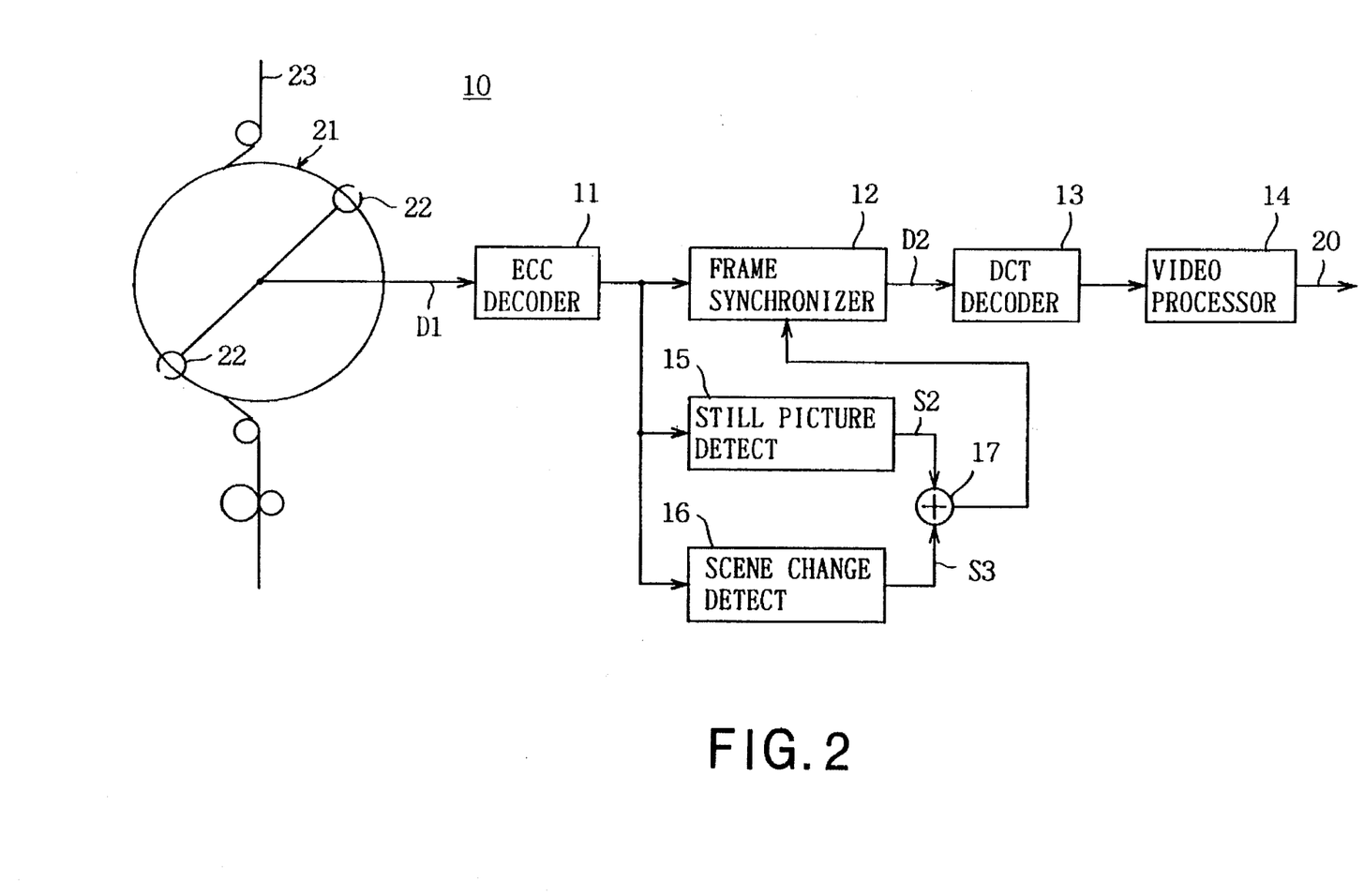
FIG. 2 is a block diagram of an image data reproducing apparatus incorporating certain embodiments of the present invention.

With reference now to the drawings, and initially to FIG. 2 thereof, an image data reproducing apparatus 10 is illustrated therein which incorporates several embodiments of the present invention. The reproducing apparatus 10 serves to reproduce image data recorded as a sequence of fields on a magnetic tape 23. As recorded, each of the fields comprises a plurality of blocks each representing a corresponding image area and transformed by discrete cosine transformation so that each block includes a DC component and a number of AC components. The apparatus 10 outputs inverse discrete cosine transformed image data at a predetermined output field repetition rate despite variations in the field repetition rate of the reproduced image data and despite differences in such repetition rate of the reproduced image data from the output field repetition rate.

The apparatus 10 includes a pair of magnetic heads 22 mounted on a head drum 21 for scanning the magnetic tape 23 in order to reproduce the image data therefrom. The reproduced data, indicated as D1 in the figures, is supplied to an ECC decoder 11 in order to correct errors in the image data, which then supplies the error corrected image data to a frame synchronizer 12.

The frame synchronizer 12 compares the field repetition rate of the reproduced image data D1 with the predetermined output field repetition rate, and responds to differences therebetween by either omitting or adding image data on a field-by-field basis so that a sequence of image data fields D2 output by the frame synchronizer 12 has a field repetition rate corresponding to the output field repetition rate. The data D2 is then supplied by the frame synchronizer 12 to a discrete cosine transform (DCT) decoder 13.

The DCT decoder 13 carries out inverse discrete cosine transformation of each of the blocks of image data supplied thereto and outputs the inverse transformed data to a video processor 14. The processor 14 carries out any of a variety of functions, such as producing a composite video signal from the inverse transformed data which it then supplies to an output terminal 20 from which the signal may be obtained in order to reproduce an image, record the signal or carry out further processing.

The data D1 supplied by the ECC decoder 11 is also input to a still picture detecting circuit 15. When the still picture detecting circuit 15 determines that the fields of the data D1 represent a still picture, it outputs a still picture detection signal S2 to the frame synchronizer 12 via an adding circuit 17. The data D1 is also supplied by the ECC decoder 11 to a scene change detecting circuit 16. The circuit 16 detects when a scene change in the sequence of fields of the data D1 has occurred, whereupon it supplies a scene change detection signal S3 to the frame synchronizer 12 via the adding circuit 17.

Figure 3A:
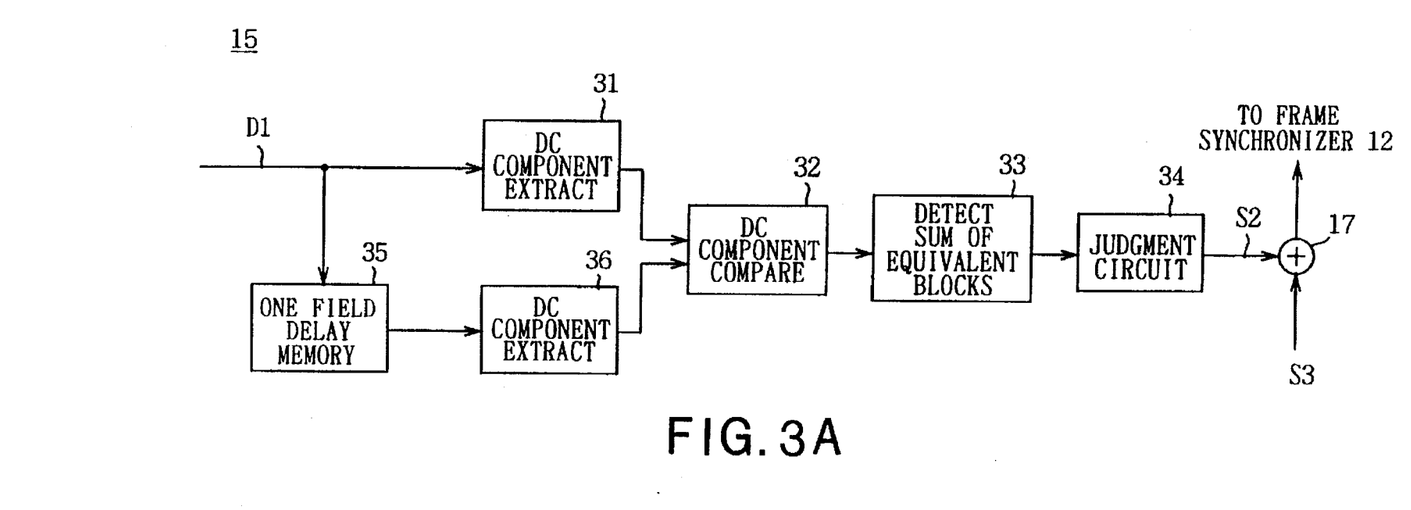
FIGS. 3A and 3B are block diagrams of embodiments of still picture detection apparatus according to the present invention employed in the reproducing apparatus of FIG. 2.

With reference also to FIG. 3A, a block diagram of an embodiment of the still picture detecting circuit 15 is illustrated therein. The circuit 15 includes a DC component extracting circuit 31 which serves to extract each DC component from each block of the image data D1 and supply the same to a first input of a DC component comparing circuit 32, described in greater detail below. The data D1 is also supplied to a field memory 35 in order to delay this data for a single field, and then supply the same to an input of a second DC component extracting circuit 36 which serves to extract the DC component from each block of the delayed field, and supply the same to a second input of the DC component comparing circuit 32.

The comparing circuit 32 compares the DC component of each block of a current field as supplied by the circuit 31 with the DC component of a corresponding block of the next preceding field as supplied by the circuit 36 to determine whether such DC components are equivalent. In the embodiment of FIG. 3A, the circuit 32 determines that DC components are equivalent if the difference therebetween is either zero, or if non-zero, within a predetermined range of values. The circuit 32 produces a signal indicating the result of the comparison to a circuit 33 which detects a sum N of equivalent blocks for each pair of compared fields and supplies the sum to a judgement circuit 34.

The judgement circuit 34 determines, for each pair of fields, whether the sum N is greater than a predetermined constant which, if true, indicates that the current field is substantially identical to the preceding field, so that the two fields represent a still picture. Thereupon, the judgement circuit 34 produces the still picture detection signal S2 which it supplies to the frame synchronizer 12 via the adding circuit 17, as explained above.

In the foregoing manner, the circuit 15 produces the still picture detecting signal S2 for each pair of fields in real time.

Figure 3B:
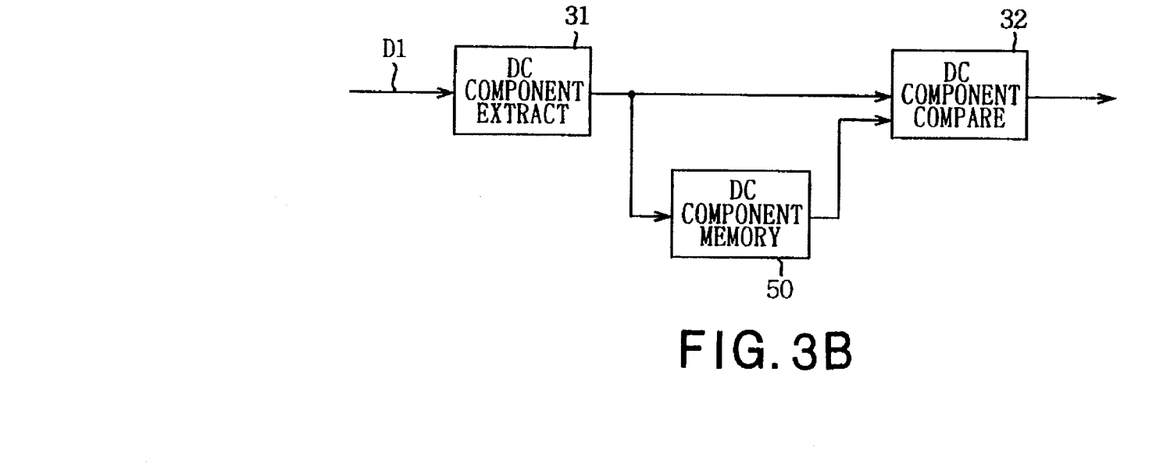

Referring now to FIG. 3B, a modified embodiment of the still picture detection circuit 15 will be explained by reference thereto. In the modified embodiment of FIG. 3B, the data D1 is supplied to the DC component extracting circuit 31 which supplies each DC component from the blocks of a current field both to a DC component memory 50 which stores the DC components of each field in order to delay the same for a single field interval, and to a first input of the DC component comparing circuit 32. A second input of the DC component comparing circuit 32 is supplied with a DC component from the memory 50 for a block of the preceding field corresponding to the block of the current field whose DC component is then supplied to the first input of the circuit 32. The DC component comparing circuit 32 carries out its comparison operation in the same manner as described above in connection with FIG. 3A. The modified embodiment of FIG. 3B is otherwise constructed and functions in the same manner as the embodiment of FIG. 3A.

It will be appreciated that the embodiment of FIG. 3B is relatively simpler than that of FIG. 3A, since it does not require the second DC component extracting circuit 36 and is able to employ a relatively smaller memory to store the DC components, since the remaining data of each field need not be stored.

Referring again to FIG. 2, in the event that the frame synchronizer 12 has determined that the frame repetition rate of the reproduced data differs from the predetermined output field repetition rate, it responds to the still picture detection signal S2 by either omitting or adding a field of the data D1 selected from the fields thereof corresponding to the still picture detection signal S2, in order to produce the image data D2 whose field repetition rate corresponds to the predetermined output field repetition rate.

Figure 4A:
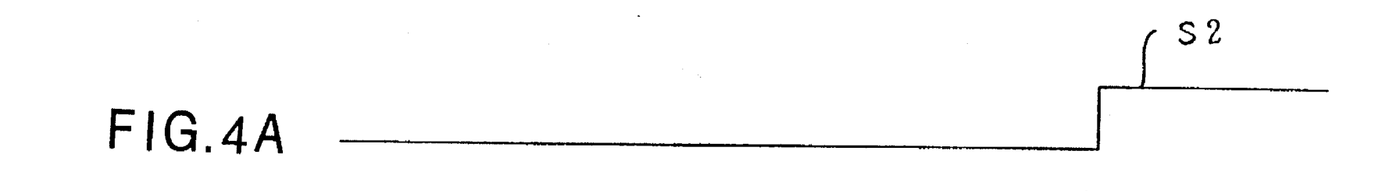
FIGS. 4 and 5 are schematic diagrams for use in illustrating the operation of the still picture detection apparatus of FIGS. 3A and 3B.
Figure 4B:
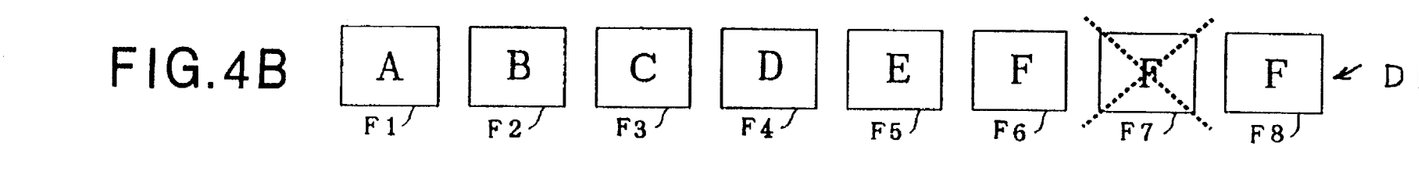
Figure 4C:
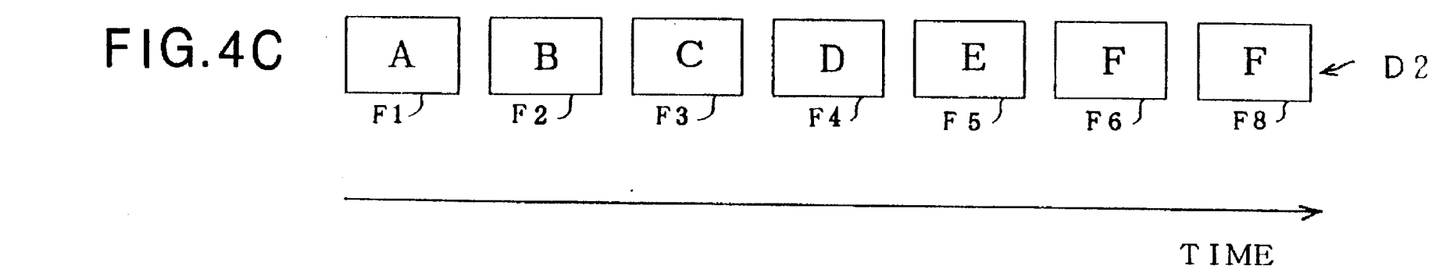

FIG. 4 is a schematic diagram for illustrating one mode of operation of the still picture detection circuits of FIGS. 3A and 3B. In the illustration of FIG. 4, a sequence of reproduced fields of image data D1 is indicated at (B) including a plurality of fields F1 through F8 reproduced in that order. In the illustration of FIG. 4 it is assumed that during an exemplary time interval eight fields of the image data D1 are reproduced from the magnetic tape 23, while according to the predetermined output field repetition rate a total of seven fields would be output by the apparatus 10 during the same interval. Accordingly, it is necessary for the reproducing apparatus 10 to delete one of the fields F1 through F8 of the sequence (B).

In the sequence of fields (B), fields F1 through F6 represent different images A through F, respectively. However, the fields F7 and F8 represent substantially the same image F as the field F6. The fact that the fields F6 and F7 represent the same image is detected by the still picture detecting circuit 15, which then outputs the still picture detection signal S2 as indicated at (A) in FIG. 4. In response to the signal S2, the frame synchronizer 12 omits the field F7 in order to produce the image data D2 as a sequence of only seven fields F1 through F6 and F8 during the illustrative time period of FIG. 4, as indicated at (C) thereof.

In an alternative mode of operation, the frame synchronizer 12 is provided with a memory to store the field F6 in order to delay the output thereof long enough to determine whether the field F7 represents the same image. If so, the frame synchronizer 12 in this alternative mode of operation omits the field F6 instead of the field F7. In a further alternative mode of operation, the frame synchronizer stores a plurality of fields and omits the field F8 instead of the field F7 since the field F8 represents substantially the same still image F.

Figure 5A:
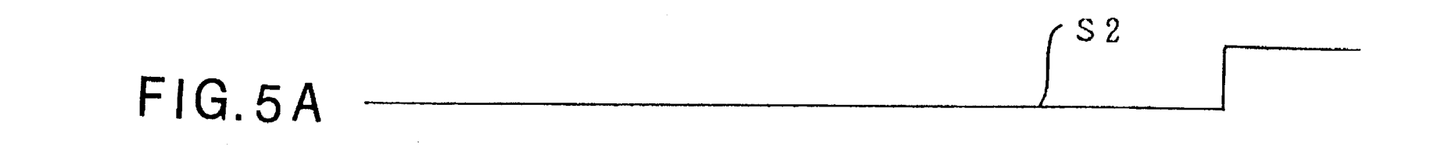
Figure 5B:
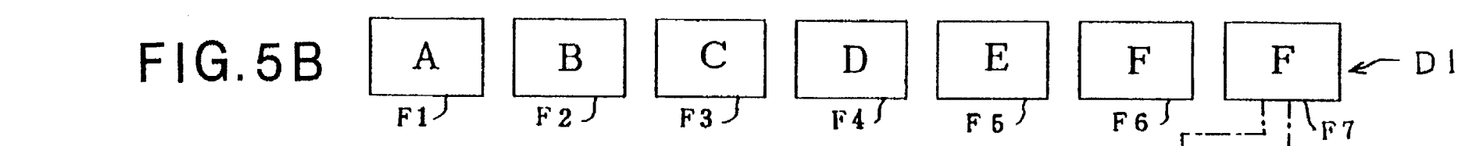
Figure 5C:
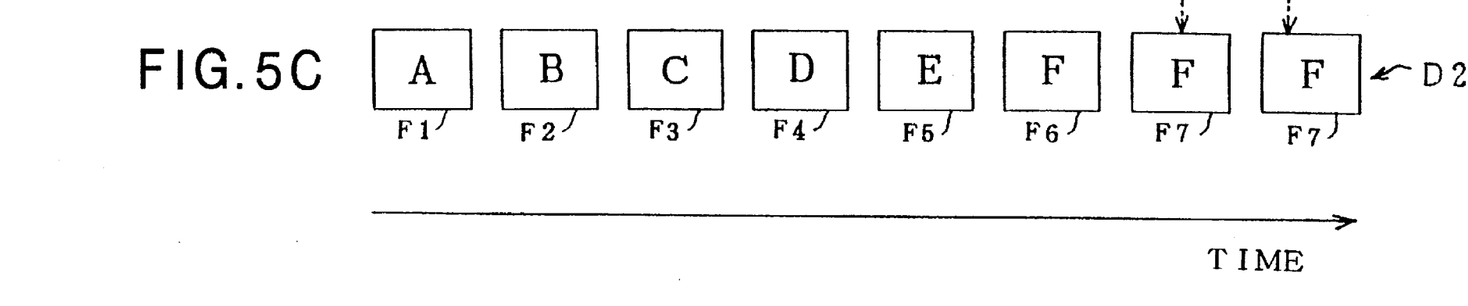

FIG. 5 provides a further illustration of the operation of the still picture detection circuits of FIGS. 3A and 3B under the conditions that the field repetition rate of the sequence of fields D1 is lower than the predetermined output field repetition rate. Referring to FIG. 5, the sequence of fields D1 is illustrated at (B) as including a sequence of fields F1 through F7 reproduced in that order. In the example of FIG. 5, fields F1 through F6 each represent different images A through F, respectively, while the field F7 represents the same image F as the field F6. In this example, the image data is reproduced from the tape 23 at a field repetition rate such that during an exemplary time frame seven fields F1 through F7 are reproduced, while during the same time period, the predetermined output field repetition rate requires that eight fields must be output.

Since the fields F6 and F7 of the sequence D1 represent substantially the same image, the still picture detection circuit 15, upon detecting this condition, outputs the signal S2 as indicated at (A) in FIG. 5. The frame synchronizer 12 responds by outputting the field F7 for two field intervals at the predetermined output field repetition rate so that the output field sequence D2 includes the fields F1 through F6 in that order followed by two fields F7 by reading the same twice from an internal memory of the frame synchronizer 12, as illustrated at (C) in FIG. 5. Accordingly, during the exemplary interval as illustrated in FIG. 5, although the sequence of fields D1 includes only seven fields F1 through F7, the image data D2 includes eight fields during the same interval by duplicating the field F7, so that the field repetition rate of the image data sequence D2 corresponds to the output field repetition rate.

Figure 6:
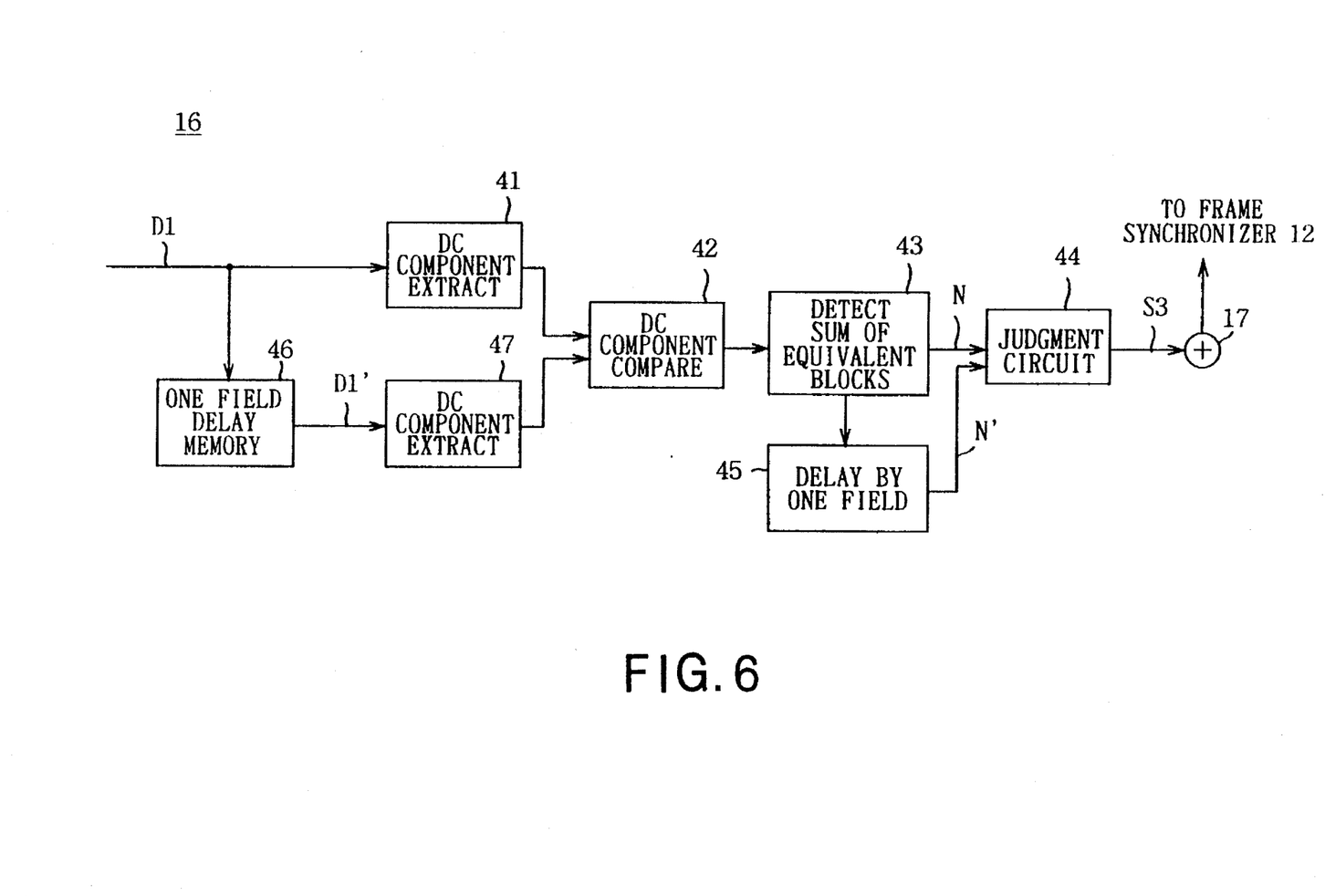
FIG. 6 is a block diagram of a scene change detection apparatus in accordance with an embodiment of the present invention which is employed in the apparatus of FIG. 2.
Figures 7A, 7B:
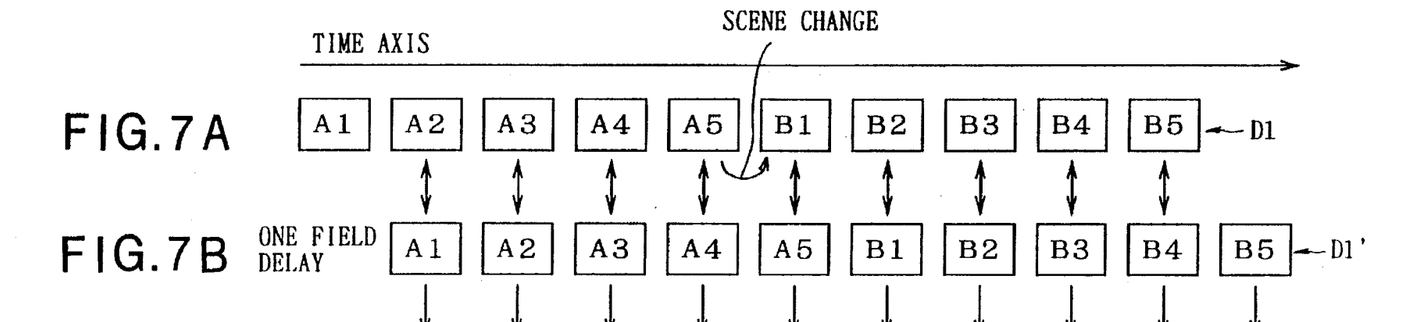
FIGS. 7, 8 and 9 are schematic diagrams for use in illustrating the operation of the apparatus of FIG. 6.
Figure 7C:
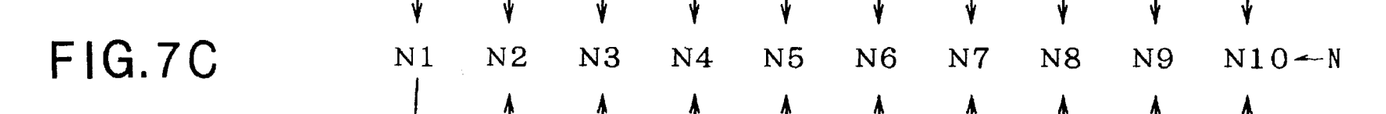
Figure 7D:
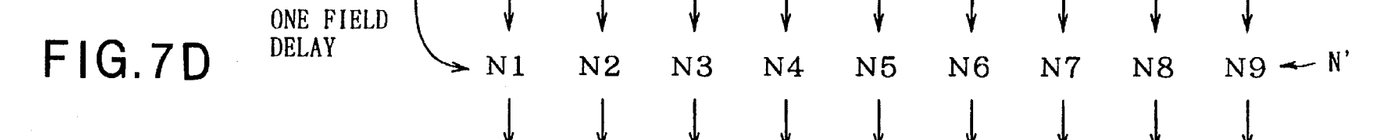
Figure 7E:
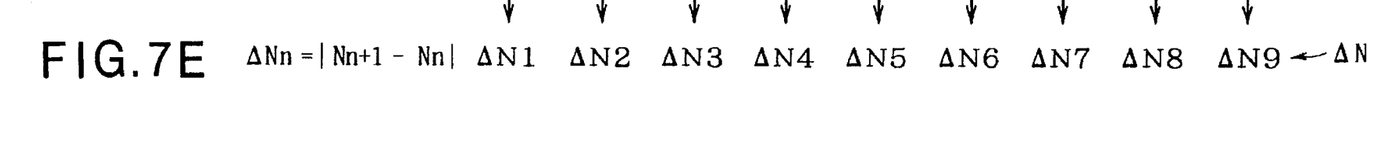

With reference now to FIG. 6, an embodiment of the scene change detection circuit 16 is illustrated therein in block form. In the embodiment of FIG. 6, the reproduced image data D1 is supplied both to a DC component extracting circuit 41 as well as to a field memory 46 which stores one field thereof in order to delay the data D1 by one field interval. The image data D1, as delayed by the memory 46 for one field interval is indicated as D1' and is supplied to an input of a further DC component extracting circuit 47. Each of the circuits 41 and 47 serves to extract the DC component of each block of data supplied thereto, and since the data D1' is delayed by one field interval with respect to the data D1, the circuits 41 and 47 are simultaneously supplied with corresponding blocks of a current field and a next preceding field, respectively.

The DC components extracted by the circuits 41 and 47 are supplied to corresponding inputs of a DC component comparing circuit 42 which serves to determine whether the DC components of corresponding blocks of the current and next preceding fields of the data D1 and D1' are equivalent. The circuit 42 determines that DC components are equivalent if they are either the same in value or if the difference therebetween is within a predetermined range of values.

A signal indicating the result of each comparison is output by the circuit 42 to a circuit 43 which detects a sum of equivalent blocks for each pair of fields, that is, the current field and the next preceding field. This sum, indicated as N, is supplied by the circuit 43 both to a first input of a judgement circuit 44 and to a circuit 45 which stores the sum N for one field interval and then outputs the delayed sum as data N' to a second input of the judgement circuit 44. The judgement circuit 44 calculates a difference ΔN between the sum N of equivalent blocks in the present field and next preceding field, and the sum N' of equivalent blocks in the next preceding field and the field next preceding that field, and then determines whether the difference ΔN is greater than a predetermined constant value. If so, the judgement circuit 44 determines that a scene change has occurred between the current field and the next preceding field and responds by producing a scene change detection signal S3 which is supplied to the frame synchronizer 12 via the adding circuit 17.

The scene change detecting process carried out by the circuit 16 is performed for each field in real time.

In the event that the field repetition rate of the reproduced image data D1 differs from the predetermined output field repetition rate, when the scene change detection signal S3 is received by the frame synchronizer 12, it responds by either omitting or adding a field as may be necessary in order to produce the desired output field repetition rate of the image date D2.

FIG. 7 is a schematic diagram for illustrating one mode of operation for the scene change detection circuit of FIG. 6. A sequence of fields A1 through A5 followed by B1 through B5 of the image data D1 is illustrated at (A) of FIG. 7, while the image data D1' output by the memory 46 is illustrated at (B) of FIG. 7. In this illustration, it is assumed that the fields A1 through A5 represent either still pictures or a continuous set of images in which there is motion, while the sequence of fields B1 through B5 also represents a sequence of still pictures or a continuous set of images in which there is motion, but that a scene change occurs between the fields A5 and B1.

The number of equivalent blocks $N_n$ between each field of the sequence D1 representing a current field and the next preceding field of the sequence D1' is represented at (C) of FIG. 7. Because of the scene change between the fields A5 and B1, the sum N of equivalent blocks when these two fields are compared and as output by the circuit 43 of FIG. 6 is a relatively small value. However, the result of each of the remaining comparisons as illustrated in FIG. 7 will yield a sum $N_n$ which is substantially larger than the sum of equivalent blocks $N_5$. Accordingly, when the judgement circuit 44 determines the difference between each sum N (represented by the sequence (C) of FIG. 7) and the one field delayed sum N' (represented as sequence (D) in FIG. 7) the result $\Delta N_4$ (see sequence (E) in FIG. 7) will be relatively large, while the remaining values $\Delta N_n$ will be relatively much smaller.

The predetermined constant employed by the judgement circuit 44 against which each of the values $\Delta N$ is compared is selected so that the values of $\Delta N_n$ obtained upon a scene change is larger than the predetermined constant, while values of $\Delta N_n$ occurring when fields representing still pictures or continuous motion are compared are less than the predetermined constant. In this manner, the judgement circuit 44 is able to determine when a scene change has occurred by detecting when the value $\Delta N_n$ (for example, $\Delta N_4$ in FIG. 7) is greater than the predetermined constant. When this occurs, the judgement circuit 44 outputs the scene change detection signal S3 which it supplies to the frame synchronizer 12 via the adding circuit 17, so that the synchronizer 12 can then, if appropriate, either omit or add a field in order to conform the field repetition rate of the image data D2 to the predetermined output rate.

Figure 8A:
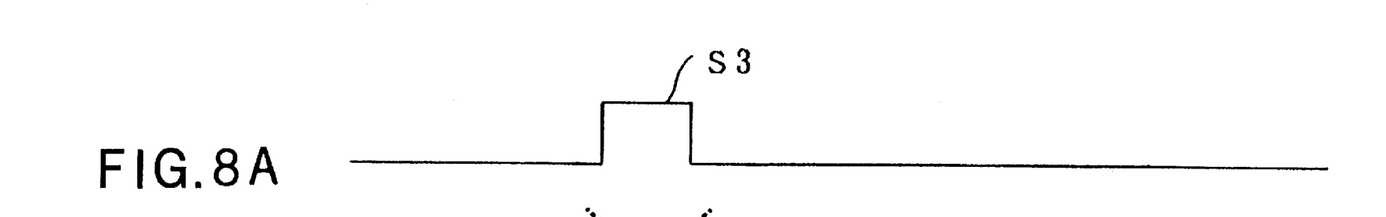
Figure 8B:
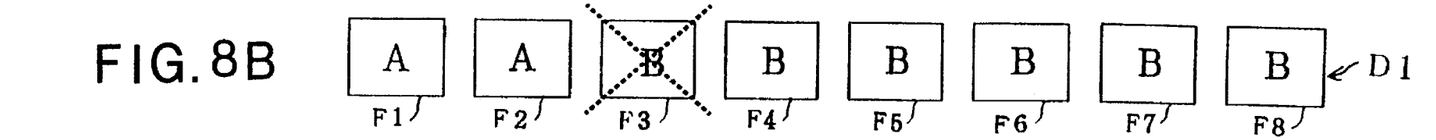
Figure 8C:
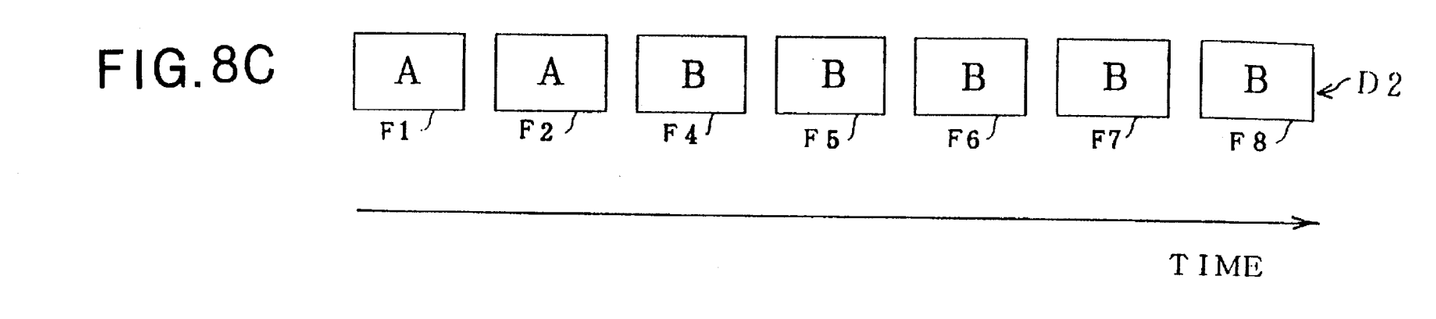

Referring now to FIG. 8, an occurrence of the scene change detection signal S3 is illustrated at (A) as a function of time, indicating that a scene change has occurred between fields F2 and F3 of the image data D1 illustrated schematically at (B) of FIG. 8. In this illustration, it is assumed that the field repetition rate of the field sequence D2 (see sequence (C) in FIG. 8) during the time interval illustrated in FIG. 8 is relatively lower than that of the image data D1, so that during this interval seven fields of the image data D2 must be output by the frame synchronizer 12 while eight fields of the image data D1 are received thereby. Accordingly, upon the occurrence of the scene change detection signal S3, the frame synchronizer 12 in one mode of operation omits the field F3 which occurs at the point of the scene change. An advantage of this mode of operation is that memory requirements are minimized. However, where sufficient memory is available, in a different mode of operation the field F2 is omitted in place of the field F3 since the field F2 also occurs at the scene change.

Figure 9A:
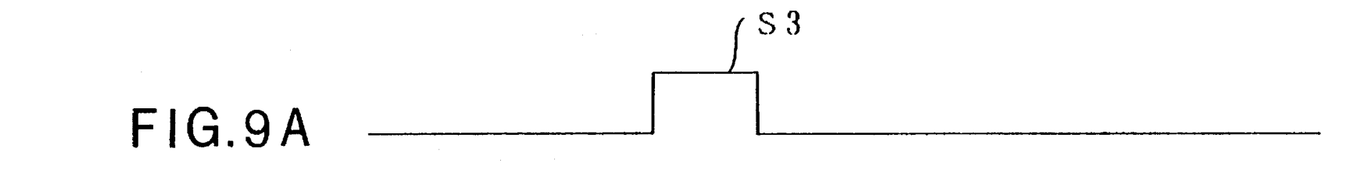
Figure 9B:
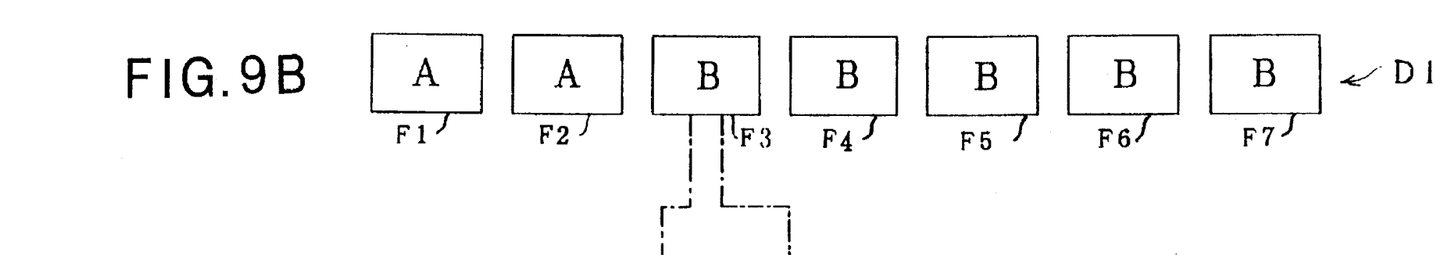
Figure 9C:
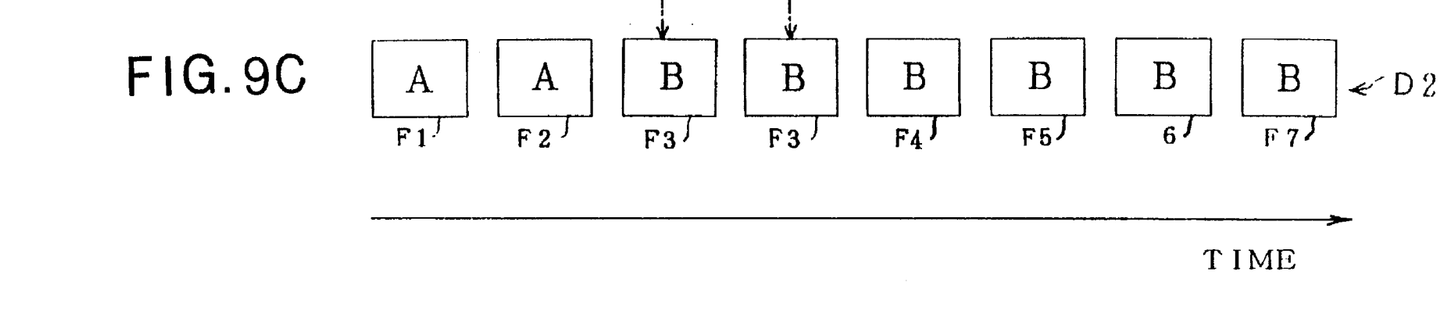

Conversely, when the field repetition rate of the image data D2 is greater than that of the image data D1, upon a scene change a field occurring at that point can be output twice by the frame synchronizer 12 in order to conform the field repetition rate of the output image data D2 with the predetermined output field repetition rate. An illustration of this mode of operation is provided in FIG. 9 wherein it is assumed that during the illustrated time period seven fields of the image data D1 are received by the frame synchronizer 12 (sequence (B)), while it must output eight fields of the image data D2 (sequence (C)) in order to conform its field repetition rate to the predetermined output rate. It is also assumed that a scene change occurs between the fields F2 and F3 of the image data D1. Accordingly, the scene change detection circuit 16 outputs the scene change detection signal S3 at the field interval F3 indicating the occurrence of the scene change, and the frame synchronizer 12 responds in one mode of operation by outputting the field F3 twice in order to produce the image data D2 output thereby. While this mode of operation minimizes the required memory capacity, where sufficient memory is available in another mode of operation the frame synchronizer 12 instead outputs the field F2 twice in order to produce the image data D2.

Figure 10:
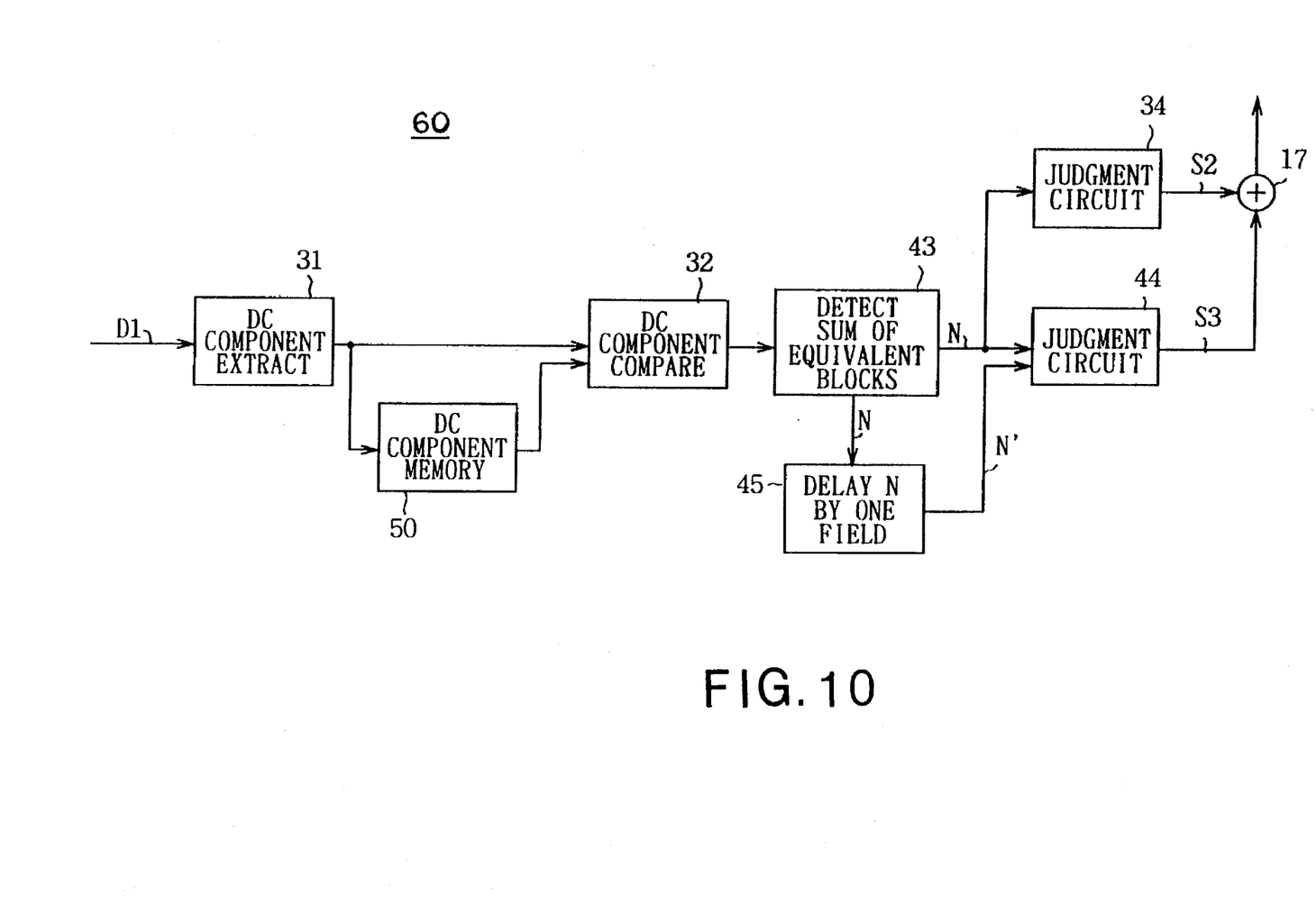
FIG. 10 is a block diagram of an apparatus in accordance with a further embodiment of the present invention which serves both to detect a still picture and to detect a scene change within image data.

Referring now to FIG. 10, a circuit 60 is illustrated therein which combines the functions of the still picture detection circuit of FIG. 3B and the scene change detection circuit 16 of FIG. 6. In the embodiment of FIG. 10, the circuits 31 and 32 as well as the memory 50 are connected in the same fashion as illustrated in FIG. 3B and carry out the same function, that is, to determine whether corresponding blocks of successive fields are equivalent. The output of the DC component comparing circuit 32 is connected to the input of the circuit 43 which, as described above in connection with FIG. 6, produces the sum N indicating the number of equivalent blocks in consecutive fields based on the output from the DC component comparing circuit 32. As in the case of the circuit of FIG. 3B, the sum N is supplied to the judgement circuit 34 which determines whether it exceeds a predetermined constant whereupon the circuit 34 outputs the still picture detection signal S2 which it supplies to the frame synchronizer 12 through the adding circuit 17 in the same manner as the still picture detection circuit of FIG. 3B.

The circuit 43 also supplies the sum N to the one field delay circuit 45 which supplies the one field delayed sum N' at an output thereof to a first input of the judgement circuit 44. A second input of the judgement circuit 44 is supplied with the sum N and determines whether the difference between the sum N and the sum N' exceeds a predetermined constant whereupon the circuit 44 outputs the scene change detection signal S3 through the adding circuit 17 to the frame synchronizer 12, in the same manner as the circuit of FIG. 6.

It will be appreciated that the circuit 60 provides a relatively simpler means of implementing the functions of the circuits 15 and 16 of FIG. 2.

In the embodiments of the invention as described above, image date which has been DCT-transformed and recorded on the magnetic tape 23 is reproduced by the apparatus 10, and the DC components of corresponding blocks of successive fields are compared to determine whether they are equivalent. The sum N of equivalent DCT blocks produced by comparing the successive fields provides a basis to determine whether there is a correlation between the images represented by the compared fields. If so, this indicates that either there is substantially no movement in such images (that is, they are still pictures) or else they represent a continuous groups of images. The apparatus 10 is then able to synchronize the reproduced image data with the predetermined output field repetition rate by selectively omitting or adding fields representing a succession of still pictures or at the boundaries of scene changes, so that apparent discontinuities in the reproduced images that would result from a random omission or addition of fields as in the prior art is avoided.

Although in the above-described embodiments fields are added or omitted one at a time, in still further embodiments of the invention a plurality of fields are either omitted or added, as needed, in order to synchronize the field repetition rate of the input image data to an output system frequency. In yet still further embodiments of the present invention, corresponding blocks of successive frames of image data are compared, and based upon such comparisons, one or more frames can be either omitted or added from or to the image data in order to synchronize the image data to a predetermined frame repetition rate.

While the embodiments of the invention described above have been applied in a device for reproducing image data from a magnetic tape, the present invention may also be applied in other types of reproducing devices, such as devices for reproducing image data from a disk-shaped recording medium or other recording media of various kinds. The invention is also applicable in the case of image data which is not been reproduced, such as image data supplied from a video camera or other source.

It will be appreciated that the various embodiments of the invention, and the elements thereof, may be implemented in whole or in part using either analog or digital circuitry and that all or part of the signal processing functions thereof may be carried out either by hardwired circuits or with the use of programmable devices such as a microprocessor, microcomputer or the like.

Although specific embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for changing the repetition rate of input image data including a sequence of field or frame image data intervals having a first repetition rate and which is to be changed to a different second repetition rate, comprising:

correlation determining means for producing a correlation value representing similarity between respective image data in first and second image data intervals of the input image data relative to a predetermined criterion;

synchronization means operative for selectively adding or subtracting the image data of at least one image data interval to or from said sequence of image data intervals of the input image data so as to produce output image data having said second repetition rate; and means connecting said correlation determining means with said synchronization means for permitting operation of said synchronization means when said correlation value indicates that said adding or subtracting of said image data of at least one image data interval will minimally disturb a display of said output image data.

2. The apparatus of claim 1, wherein the correlation determining means is operative to produce a still image detection signal when the correlation value indicates a predetermined similarity between said image data in said first and second image data intervals which is characteristic of a still image, and wherein the synchronization means is made operative for either said adding or subtracting of the image data of at least one image data interval to or from the input image data to produce the output image data with said second repetition rate during the existence of the still image detection signal.

3. The apparatus of claim 2, wherein the first image data interval precedes the second image data interval and the synchronization means is operative to either add or omit the data of the second image data interval to or from the image data to produce the output image data in response to the still image detection signal.

4. The apparatus of claim 2, wherein the first image data interval precedes the second image data interval, and wherein the synchronization means is operative to either add or omit the data of the first image data interval to or from the image data to produce the output image data in response to the still image detection signal.

5. The apparatus of claim 2 wherein the correlation determining means is operative to produce said correlation value by comparing spatially corresponding subsets of the first and second image data intervals to produce the correlation value as a number of the compared spatially corresponding subsets representing substantially the same image, and wherein the correlation determining means is operative to produce the still image detection signal when said correlation value exceeds a predetermined threshold value.

6. The apparatus of claim 5, wherein the image data is in the form of a sequence of image data intervals each comprising a plurality of discrete cosine transformed (DCT) blocks each including at least a DC component, and wherein the correlation determining means is operative to compare DC components of spatially corresponding DCT blocks of the first and second image data intervals to produce said correlation value as a number of the spatially corresponding DCT blocks having equivalent DC components.

7. The apparatus of claim 1, in combination with image data reproducing means for reproducing the image data from a record medium.

8. The apparatus of claim 7, wherein the image data reproducing means comprises means for reproducing the image data from a magnetic tape.

9. An apparatus for changing the repetition rate of image data including a first sequence of field or frame image data intervals having a first repetition rate and including a first image data interval which precedes a second image data interval which, in turn, precedes a third image data interval, comprising:

correlation determining means operative to produce a first correlation value representing similarity between the first and second image data intervals of the image data based on a first predetermined criterion, and further to produce a second correlation value representing similarity between the second and third image data intervals based on the first predetermined criterion;

scene change detection means for producing a scene change detection signal representing dissimilarity between the first and second correlation values based on a second predetermined criterion; and synchronization means operative to selectively add or subtract the image data of at least one image data interval to or from the first sequence of image data intervals so as to produce output image data with a second repetition rate different from said first repetition rate in response to the scene change detection signal.

10. The apparatus of claim 9, wherein the synchronization means is operative to selectively add or omit the image data of the third image data interval to or from the image data in response to the scene change detection signal.

11. The apparatus of claim 9, wherein the synchronization means is operative to selectively add or omit the image data of the second image data interval to or from the image data in response to the scene change detection signal.

12. The apparatus of claim 9, wherein the correlation determining means is operative to produce the first correlation value by comparing spatially corresponding subsets of the first and second image data intervals to produce the first correlation value as a number of the compared spatially corresponding subsets representing substantially the same image, and is further operative to produce the second correlation value by comparing spatially corresponding subsets of the second and third image data intervals to produce the second correlation value as a number of the compared spatially corresponding subsets representing substantially the same image, and wherein the scene change detection means is operative to produce the scene change detection signal when a difference between the first and second correlation values exceeds a predetermined threshold value.

13. The apparatus of claim 12, wherein the image data is in the form of a sequence of image data intervals each comprising a plurality of discrete cosine transformed (DCT) blocks each including at least a DC component, and wherein the correlation determining means is operative to compare DC components of spatially corresponding DCT blocks of the first and second image data intervals and the second and third image data intervals in order to produce the first and second correlation values, respectively, as numbers of the spatially corresponding DCT blocks having equivalent DC components.

14. A method for changing the repetition rate of input image data including a sequence of field or frame image data intervals having a first repetition rate and which is to be changed to a different second repetition rate, comprising the steps of:
producing a correlation value representing similarity between respective image data in first and second image data intervals of the input image data relative to a predetermined criterion;
selectively adding or subtracting the image data of at least one image data interval to or from said sequence of image data intervals of the input image data so as to produce output image data having said second repetition rate; and
controlling said selective adding or subtracting of the image data in response to said correlation value so to occur when said adding or subtracting of said image data of at least one image data interval will minimally disturb a display of said output image data.

15. The method of claim 14, wherein the step of producing said correlation value comprises determining whether the first and second image data intervals represent a still image and, in the event that they do, providing a still image detection signal, and the step of selectively adding or subtracting the image data is timed to occur upon the provision of said still image detection signal.

16. The method of claim 15, wherein the step of selectively adding or subtracting image data comprises selectively adding or subtracting the image data of the second image data interval to or from said input image data.

17. The method of claim 15, wherein the step of selectively adding or subtracting image data comprises selectively adding or subtracting the image data of the first image data interval to or from said input image data.

18. The method of claim 14, wherein the step of producing said correlation value includes determining whether the first and second image data intervals occur at the boundary between different scenes and, in the event that they do, providing a scene change detection signal, and the step of selectively adding or subtracting image data is timed to occur upon the provision of the scene change detection signal.

19. The method of claim 18, wherein the step of selectively adding or subtracting image data comprises adding or subtracting the image data of the second image data interval to or from the input image data upon said occurrence of the scene change detection signal.

20. The method of claim 18, wherein the step of selectively adding or subtracting image data comprises adding or subtracting the image data of the first image data interval from the input image data in response to the scene change detection signal.

21. An apparatus for detecting that a sequence of field or frame image data intervals represents a still image, the image data intervals each being provided in the form of a plurality of blocks which have been transformed by discrete cosine transformation, comprising:
means for obtaining a direct current component of each of a plurality of blocks of a first image data interval;
means for obtaining a direct current component of each of a plurality of blocks of a second image data interval next following the first image data interval in the sequence;
means for comparing the direct current components of corresponding blocks of the first and second image data intervals to determine an equivalence of such corresponding blocks;
means for producing sum data representing a number of the corresponding blocks of the first and second image data intervals that are equivalent; and
means for producing a still picture detection signal when the sum data exceeds a predetermined threshold value.

22. The apparatus of claim 21, wherein the comparing means is operative to determine an equivalence of the corresponding blocks when a difference between their direct current components is within a predetermined range of values.

23. A method of detecting that a sequence of field or frame image data intervals represents a still image, the image data intervals each being provided in the form of a plurality of blocks which have been transformed by discrete cosine transformation, comprising the steps of:
obtaining a direct current component of each of a plurality of blocks of a first image data interval;
obtaining a direct current component of each of a plurality of blocks of a second image data interval next following the first image data interval in the sequence;
comparing the direct current components of corresponding blocks of the first and second image data intervals to determine an equivalence of such corresponding blocks;
producing sum data representing a number of the corresponding blocks of the first and second image data intervals that are equivalent; and
producing a still picture detection signal when the sum data exceeds a predetermined threshold value.

24. An apparatus for detecting a scene change within image data including a sequence of field or frame image data intervals each in the form of a plurality of blocks which have been transformed by discrete cosine transformation, comprising:
means for obtaining a direct current component of each of a plurality of blocks of a first image data interval;
means for obtaining a direct current component of each of a plurality of blocks of a second image data interval next following the first image data interval in the sequence;
first comparing means for comparing the direct current components of corresponding blocks of the first and second image data intervals to determine an equivalence of such corresponding blocks;
means for producing first sum data representing a number of the corresponding blocks of the first and second image data intervals that are equivalent;
means for obtaining a direct current component of each of a plurality of blocks of a third image data interval next following the second image data interval in the sequence;

second comparing means for comparing the direct current components of corresponding blocks of the second and third image data intervals to determine an equivalence of such corresponding blocks;

means for producing second sum data representing a number of the corresponding blocks of the second and third image data intervals that are equivalent;

means for determining a difference between the first and second sum data; and means for producing a scene change detection signal when the difference between the first and second sum data exceeds a predetermined threshold value.

25. The apparatus of claim 24, wherein the first and second comparing means are operative to determine that corresponding blocks are equivalent when a difference between their direct current components is within a predetermined range of values.

26. A method of detecting a scene change within image data including a sequence of field or frame image data intervals each in the form of a plurality of blocks which have been transformed by discrete cosine transformation, comprising the steps of:

obtaining a direct current component of each of a plurality of blocks of a first image data interval;

obtaining a direct current component of each of a plurality of blocks of a second image data interval next following the first image data interval in the sequence;

comparing the direct current components of corresponding blocks of the first and second image data intervals to determine an equivalence of such corresponding blocks;

producing first sum data representing a number of the corresponding blocks of the first and second image data intervals that are equivalent;

obtaining a direct current component of each of a plurality of blocks of a third image data interval next following the second image data interval in the sequence;

comparing the direct current components of corresponding blocks of the second and third image data intervals to determine an equivalence of such corresponding blocks;

producing second sum data representing a number of the corresponding blocks of the second and third image data intervals that are equivalent;

determining a difference between the first and second sum data; and producing a scene change detection signal when the difference between the first and second sum data exceeds a predetermined threshold value.

* * * * *